(12) United States Patent
Sanaullah et al.

(10) Patent No.: US 10,063,708 B2
(45) Date of Patent: *Aug. 28, 2018

(54) SYSTEM AND METHOD FOR TRANSFERRING OR REJOINING A CALL FROM ANY DEVICE

(71) Applicant: Dell Products, LP, Round Rock, TX (US)

(72) Inventors: Abu Shaher Sanaullah, Austin, TX (US); Claude Lano Cox, Austin, TX (US); Charles D. Robison, Round Rock, TX (US); Philip M. Seibert, Austin, TX (US); Jason A. Shepherd, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,662

(22) Filed: Feb. 29, 2016

(65) Prior Publication Data

US 2016/0182729 A1 Jun. 23, 2016

Related U.S. Application Data

(63) Continuation of application No. 13/720,421, filed on Dec. 19, 2012, now Pat. No. 9,307,373.

(51) Int. Cl.
| | |
|---|---|
| *H04M 3/42* | (2006.01) |
| *H04M 3/58* | (2006.01) |
| *H04W 4/16* | (2009.01) |
| *H04L 29/06* | (2006.01) |
| *H04M 3/56* | (2006.01) |

(Continued)

(52) U.S. Cl.
CPC ........... *H04M 3/58* (2013.01); *H04L 12/1827* (2013.01); *H04L 65/403* (2013.01); *H04L 67/147* (2013.01); *H04M 1/274566* (2013.01); *H04M 3/56* (2013.01); *H04M 3/563* (2013.01); *H04W 4/16* (2013.01); *H04W 4/80* (2018.02); *H04M 2203/2088* (2013.01); *H04W 76/19* (2018.02); *H04W 88/06* (2013.01)

(58) Field of Classification Search
CPC ........... H04M 1/7253; H04M 2250/02; H04M 2250/04; H04W 76/028; H04W 76/02; H04L 12/189
USPC ........................................................ 455/416
See application file for complete search history.

(56) References Cited

U.S. PATENT DOCUMENTS

| | | |
|---|---|---|
| 6,163,692 A | 12/2000 | Chakrabarti et al. |
| 6,275,713 B1 | 8/2001 | Toda |

(Continued)

OTHER PUBLICATIONS

"Automate Call Forwarding with Bluetooth Proximity Detection," Miller, Nov. 8, 2005; Engadget for webOS; http://www.engadget.com/2005/11/08/automate-call-forwarding-with-bluetooth-proximity-detection/.

*Primary Examiner* — Timothy Pham
(74) *Attorney, Agent, or Firm* — Prol Intellectual Property Law, PLLC; H. Kenneth Prol

(57) ABSTRACT

A method for establishing a connection to a sequence-accessible call includes gathering connection data for establishing the connection to the sequence-accessible call including a phone number dialed to access the sequence-accessible call. The method may also include storing the connection data in a database, determining a presence of a proximity link, and transmitting the connection data to an information handling system.

20 Claims, 4 Drawing Sheets

(51) Int. Cl.
*H04L 12/18* (2006.01)
*H04L 29/08* (2006.01)
*H04M 1/2745* (2006.01)
*H04W 4/80* (2018.01)
*H04W 88/06* (2009.01)
*H04W 76/19* (2018.01)

(56) References Cited

U.S. PATENT DOCUMENTS

| | | |
|---|---|---|
| 7,171,221 B1 | 1/2007 | Amin et al. |
| 2003/0003900 A1 | 1/2003 | Goss et al. |
| 2004/0235509 A1 | 11/2004 | Burritt et al. |
| 2005/0048981 A1 | 3/2005 | Anupam et al. |
| 2007/0232284 A1 | 10/2007 | Mason et al. |
| 2008/0037746 A1 | 2/2008 | Dufrene et al. |
| 2009/0203375 A1 | 8/2009 | Gisby et al. |
| 2010/0198644 A1 | 8/2010 | Renfro et al. |
| 2010/0260075 A1 | 10/2010 | Smith et al. |
| 2011/0143736 A1 | 6/2011 | Winter |
| 2012/0243673 A1 | 9/2012 | Carr et al. |
| 2012/0275349 A1* | 11/2012 | Boyer ................ H04L 12/1822 370/261 |
| 2013/0029648 A1 | 1/2013 | Soundrapandian et al. |
| 2013/0065521 A1* | 3/2013 | Jang .................. G06K 7/10237 455/41.1 |
| 2013/0189967 A1 | 7/2013 | Ritter et al. |
| 2013/0252547 A1* | 9/2013 | Cho ...................... H04W 4/008 455/41.1 |
| 2014/0073300 A1* | 3/2014 | Leeder ................ H04B 5/0031 455/416 |
| 2015/0046830 A1 | 2/2015 | Formo |

* cited by examiner

SYSTEM AND METHOD FOR TRANSFERRING OR REJOINING A CALL FROM ANY DEVICE

CROSS REFERENCE TO RELATED APPLICATIONS

This application is a continuation of prior application Ser. No. 13/720,421, filed Dec. 19, 2012, entitled "System and Method for Transferring or Rejoining a Conference Call from Any Device," invented by Abu Shaher Sanaullah et al., the disclosures of which are hereby expressly incorporated by reference in their entirety.

FIELD OF THE DISCLOSURE

The present disclosure generally relates to a system and method for seamless connectivity to a sequence-accessible call across devices or reconnection to an interrupted sequence-accessible call.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
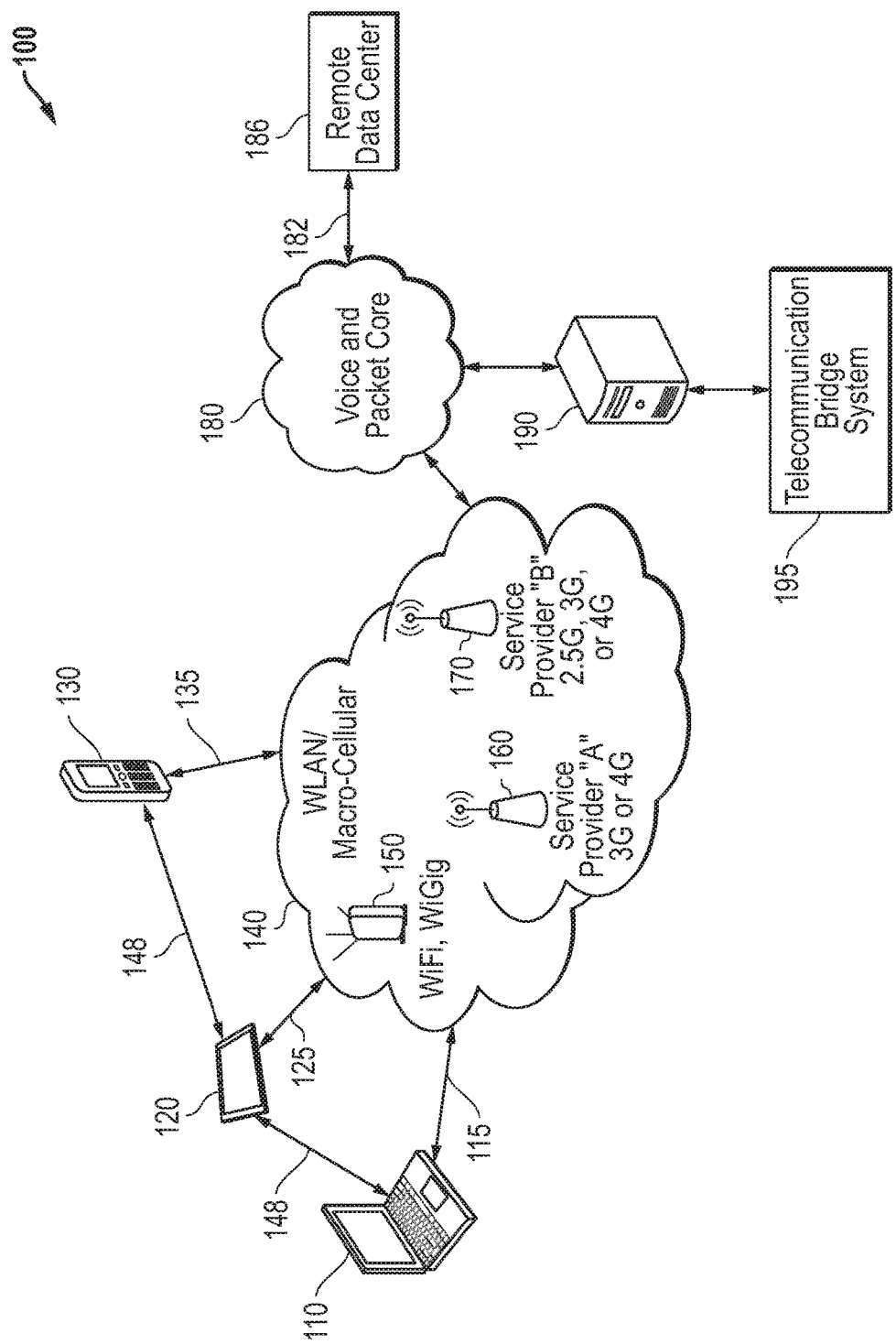
FIG. 1 is a block diagram of a network environment containing various information handling systems available for voice and data communication with a sequence-accessible call, according to an embodiment of the present disclosure.

FIG. 1 illustrates a network 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a smartphone, a PDA, a mobile information handling system, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic, and operates to execute code. Additional components of the information handling system may include one or more storage devices that can store code, one or more communications ports for communicating with external devices as well as various input and output (I/O) devices, such as a keyboard, a mouse, and a video display. The information handling system may also include one or more buses operable to transmit communications between the various hardware components.

In a particular embodiment, network 100 includes networked mobile information handling systems 110, 120, and 130, wireless network access points 150, macrocellular towers 160 and 170, and multiple other wired and wireless connection link options. Systems 110, 120, and 130 represent a variety of computing resources of network 100 including client mobile information handling systems, data processing servers, network storage devices, local and wide area networks, or other resources as needed or desired. As specifically depicted, systems 110, 120, and 130 may be a laptop computer, tablet computer, or smartphone device. These user mobile information handling systems 110, 120, and 130, may access a wireless voice and data resources 140 such as a local area network or a macro-cellular network. For example, the wireless local area network may be the wireless local area network (WLAN), a wireless personal area network (WPAN), or a wireless wide area network (WWAN). Since WPAN or WiFi Direct Connection and WWAN networks can functionally operate similar to WLANs, they may be considered as wireless local area networks (WLANs) for purposes herein. Components of a WLAN may be connected by wireline or Ethernet connections to a wider external network. For example, wireless network access points 150 may be connected to a wireless network controller and an Ethernet switch. Wireless communications across wireless local area network may be via standard protocols such as IEEE 802.11 Wi-Fi, IEEE 802.11ad WiGig, IEEE 802.15 WPAN or similar wireless network protocols.

Alternatively, other available wireless links within network 100 may include wireless macro-cellular connections via one or more service providers 160 and 170. In this way, mobile information handling systems 110, 120, and 130 may communicate voice and data within network 100. Service provider macro-cellular connections may include 2G standards such as GSM, 2.5G standards such as GSM EDGE and GPRS, 3G standards such as W-CDMA/UMTS and CDMA 2000, or 4G standards such as WiMAX, LTE, and LTE Advanced.

To communicate within the network 100 wirelessly, the systems 110, 120, and 130 each have a wireless interface module or wireless adapter, hereinafter referred to as a wireless adapter. System 110 includes a wireless adapter, system 120 includes a wireless adapter, and system 130 includes a wireless adapter. The wireless adapters are operable to provide a wireless radio frequency interface 115, 125, and 135 to transmit and receive voice and data between the respective systems 110, 120, and 130 and one or more external networks via wireless network 140. Wireless links 115, 125, and 135 may connect to the external network via a WPAN, WLAN or similar wireless switched Ethernet connection. The wireless data communication standards set forth protocols for communications and routing via access point 145, as well as protocols for a variety of other operations. Other operations may include handoff of client devices moving between nodes, self-organizing of routing operations, or self-healing architectures in case of interruption.

Wireless links 115, 125, and 135 may connect to a macro-cellular wireless network 150 via one of the service providers 160 or 170. In the depicted example, service provider A 160 may provide wireless data connectivity via a 3G or 4G protocol. Service provider B 170 may offer connectivity via a 2.5G, 3G or 4G protocol. Any combination of macro-cellular wireless connectivity is possible for each or both of the service providers. The connection quality of service (QOS) and speed of wireless links 115, 125, and 135 may vary widely depending on several factors including the service provider bandwidth, the number of mobile information handling systems and users in a location, radiofrequency signal strength or quality, success of handoff measures and other factors. Due to varying quality of service, a call may be inadvertently dropped or terminated for a number of reasons. This can be very problematic during sequence-accessible calls, such as conference calls, involving participants on mobile devices or when a call participant switches between devices during the a sequence-accessible call such as a conference call. Reconnecting by dialing in, entering passcodes, responding to voice prompts and other connection access procedures may be time consuming and burdensome. Additionally it may cause delay during the sequence-accessible call, such as delaying a conference call. The present disclosure provides an efficient system and method for transferring a sequence-accessible call between user information handling systems mid-call and reconnecting to calls after a call has been dropped or transferred unsuccessfully.

The voice and packet core network 180 may contain externally accessible computing resources and connect to a remote data center 186. The voice and packet core network 180 may contain multiple intermediate web servers or other locations with accessible data (not shown). Connection 182 between the wireless network 140 and remote data center 186 may be via Ethernet or another similar connection to the world-wide-web, a WAN, a LAN, another WLAN, or other network structure. Such a connection 182 via WLAN access point/Ethernet switch 145 to the external network is a backhaul connection. The access point 150 may be connected to one or more wireless access points in the WLAN before connecting directly to a mobile information handling system or may connect directly to one or more mobile information handling systems 110, 120, and 130. Alternatively, mobile information handling systems 110, 120, and 130 may connect to the external network via base station locations at service providers such as 160 and 170. These service provider locations may be network connected via backhaul connectivity through the voice and packet core network 180.

Remote data center 186 may include web servers or resources within a cloud environment. For example, remote data centers can include additional information handling systems, data processing servers, network storage devices, local and wide area networks, or other resources as needed or desired. Having such remote capabilities may permit fewer resources to be maintained at the client mobile information handling systems 110, 120, and 130 allowing streamlining and efficiency within those devices. Similarly, remote data center 186 permits fewer resources to be maintained in other parts of network 100.

In an example embodiment, the cloud or remote data center 186 may run hosted applications for systems 110, 120, and 130. This may occur by establishing a virtual machine application executing software to manage applications hosted at the remote data center 186. Mobile information handling systems 110, 120, and 130 are adapted to run one or more applications locally, and to have hosted applications run in association with the local applications at remote data center 186. The virtual machine application may serve one or more applications to each of user mobile information handling systems 110, 120, and 130. Thus, as illustrated, systems 110, 120, and 130 may be running applications locally while requesting data objects related to those applications from the remote data center 186 via wireless network. For example, an electronic mail client application may run locally at system 110. The electronic mail client application may be associated with a host application that represents an electronic mail server. In another example, a data storage client application such as Microsoft Sharepoint may run on system 120. It may be associated with a host application running at remote data center 186 that represents a Sharepoint data storage server. In a further example, a web browser application may be operating at system 130. The web browser application may request web data from a host application that represents a hosted website and associated applications running at remote data center 186.

Also connected to the voice and packet core network 180, server 190 may operate as a teleconference bridge or other system for managing accesses to sequence-accessible calls requiring verification of data to connect or permit access to a system. Server 190 may operate teleconferencing application or other similar call access management system 195 to receive telecommunication accesses via one or more dial in numbers similar to those used in the art. Teleconferencing application or call management application 195 may prompt users of the telecommunications bridge, such as a teleconference bridge or other system for managing accesses to sequence-accessible calls, to input passcodes, host codes, user identification, and voice prompts among other connection access information. The teleconferencing application 195 further coordinates incoming calls to one or more teleconferences, verifies inputs, and connects callers to a teleconference. The teleconferencing application 195 may have additional functionality such as an ability to accept commands during the teleconference (e.g., mute, volume and other controls). Additionally, teleconferencing application 195 may have an ability to share data such as presentation powerpoints, realtime data, or other applications to be viewed and utilized by callers in the teleconference. A call management system 195, other than a teleconferencing management system, may similarly prompt users to input data responses, access codes, host codes, user identification, voice prompts or other data for accessing an automated call-in system to connect to a call or data. An example of such a call management system 195 may be an automated telephone system requiring a sequence of option keys to establish a call or access data.

The wireless adapters in systems 110, 120, and 130 can represent add-in cards, wireless network interface modules that are integrated with a main board of respective systems 110, 120, and 130 or integrated with another wireless network interface capability, or any combination thereof. In an embodiment the wireless adapters may include one or more radio frequency subsystems including transmitters and wireless controllers for connecting via a multitude of wireless links. In an example embodiment, a mobile information handling system may have a transmitter for Wifi or WiGig connectivity and one or more transmitters for macro-cellular communication. The radio frequency subsystems include wireless controllers to manage authentication, connectivity, communications, power levels for transmission, buffering, error correction, baseband processing, and other functions of the wireless adapters.

Although 115, 125, and 135 are shown connecting wireless adapters to wireless network 140, actual wireless communication may link through a wireless access point 150 or a service provider tower such as that shown with service provider A 160 or service provider B 170. The wireless adapters may be capable of connecting via a WLAN 140 or a macro-cellular network (WWAN) 150 and service provider 160 or 170 in a variety of the wireless standards as described above. Each of the wireless adapters for client mobile information handling systems 110, 120, and 130 are uniquely identified on network 100 via one or more unique identifiers permitting authentication and access. For example, the wireless device can each be identified by one or more Subscriber Identity Modules (SIM), one or more of a media access control (MAC) address, an Internet protocol (IP) address, a world wide name (WWN), or another unique identifier such as a user name and password, as needed or desired. Association of a user and a wireless interface module of a user information handling system may be made via communications across a networking control plane. For example, a user information handling system may be associated with a user via communication with a database such as Home Subscriber Server (HSS), Active Directory or similar database. This database may reside in the voice and packet core network 180, at a base station at 160 or 170, or elsewhere in the external network. The wireless adapters may operate in accordance with any wireless data communication standards. To communicate with wireless local area network 140, standards including IEEE 802.11 WLAN standards, IEEE 802.15 WPAN standards, WWAN such as 3GPP or 3GPP2, or similar wireless standards may be used. The wireless LAN network 140 may provide connectivity via WiFi or WiGig for example. The wireless network 140 may have a wireless mesh architecture in accordance with mesh networks described by the above wireless data communications standards or similar standards.

A wireless link between systems 110, 120, and 130 may also be made via a near-field communication (NFC) 148. Systems 110, 120, and 130 contain NFC antennas and subsystems. Since one aspect of the disclosed embodiments involves transfer of teleconference call accessibility connection data or other sequence-accessible connection data between user information handling systems, NFC wireless links are depicted at 148 in FIG. 1. Alternatively, NFC wireless links may work according to various standards such as those defined by the NFC Forum or other standards bodies. Example standards for near field communication interfacing and protocols may include ISO14443 A/B, ISO 15693, ISO 18092, ISO 21481, JIS(x)-6314, and similar standards governing near field communication set up, interfacing, transmission/reception, processing, and security. NFC wireless links require user information handling systems to have NFC antennas (or coils, etc.) to be brought in close physical proximity to one another. In some cases, the transmitting and receiving devices may actually touch. This NFC link data communication is sometimes referred to as a bump even if no physical contact necessarily occurs. The proximity may vary depending on the standard used or the settings of the devices, but may be on the order of a several centimeters or less in an example embodiment. Further description of an NFC link data exchange of teleconference access or other sequence-accessible connection data is below. Hereinafter, a conference call may be deemed an embodiment of a type of sequence-accessible call.

Figure 2:
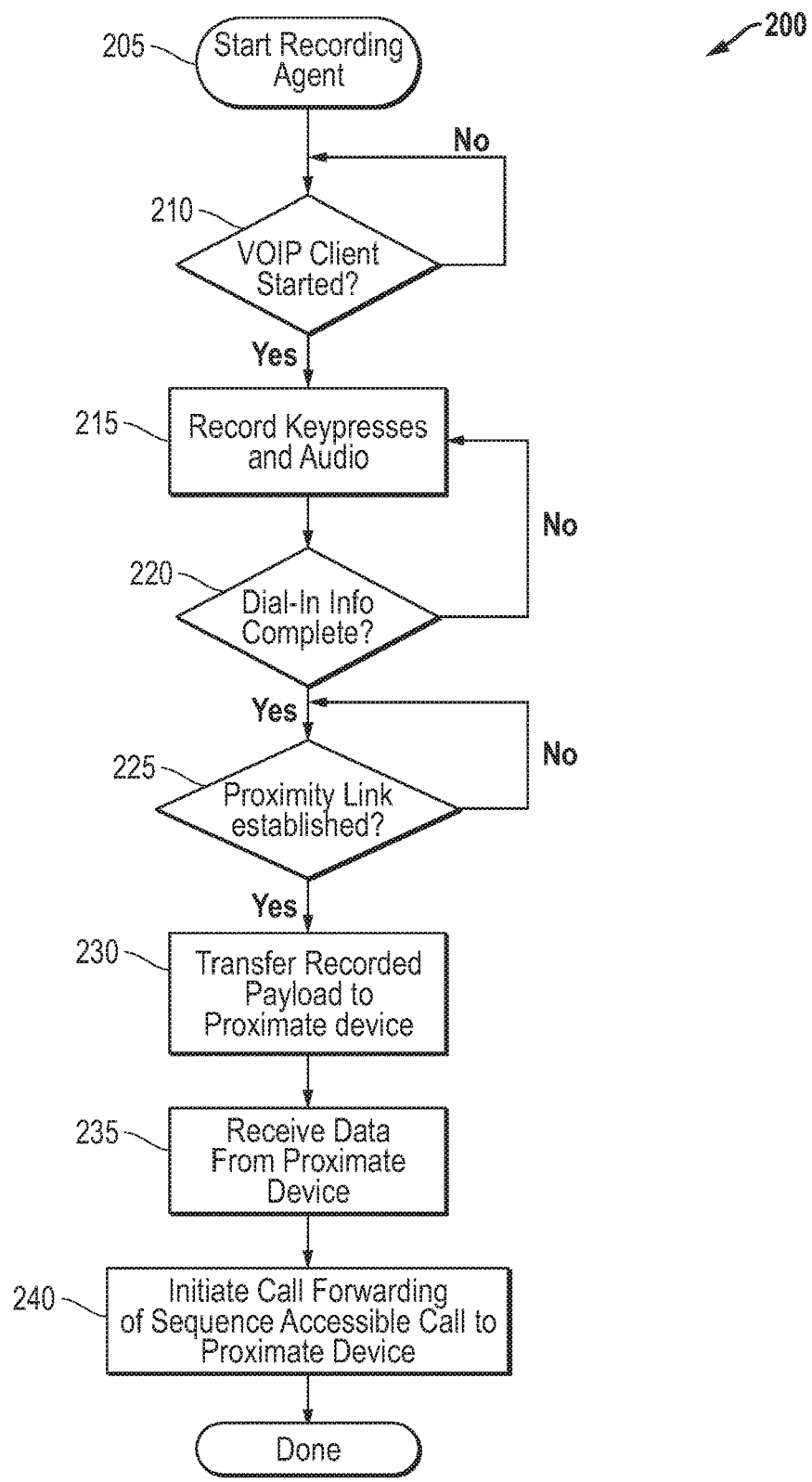
FIG. 2 is a flow diagram illustrating a method of connection data gathering by a user information handling systems pertaining to sequence-accessible call connectivity, according to an embodiment of the present disclosure.

FIG. 2 shows a method 200 in accordance with an embodiment of the present disclosure for a sequence-accessible call connection data gathering and transfer process embodiment. The method 200 generally describes user context initialization of a connection data gathering or recording system to record keystroke or keypress inputs and voice responses. In the embodiment of method 200, the flow is depicted in a particular order, however the method to gather connection data may occur in any order and the disclosure is not limited to the order shown in 200. Additionally, the embodiment depicted in method 200 is a specific embodiment involving an example of data gathering from a user information handling system communicating with a conference call bridge or call access management system via a voice-over-IP (VOIP). The gathered connection data may be transferred to another system that may, for example, connect via a macrocellular connection such as CDMA to a sequence-accessible call. Although the embodiment in FIG. 2 indicates connection via a VOIP client, the disclosed system is understood to be network-type agnostic. That means connection data gathering and transfer may occur on a user information handling system connecting via any network type and communication protocol and transfer connection data to a user information handling system running on any other type of network and protocol. FIG. 2 depicts only one embodiment.

The flow begins at block 205 where a new user information handling system starts the connection data recording agent to detect and monitor sequence-accessible call dial in keystrokes and voice responses. The connection data recording agent may be manually started by the user of the information handling system, or may automatically be activated upon accessing a voice link by dialing to make a phone call. The flow proceeds to decision diamond 210 where the user information handling system may have begun a call using any of the telecommunications connection protocols to open a voice and/or data link to a telecommunications system and, specifically, to a telecommunications bridge. At decision diamond 210, the connection data recording agent determines if a VOIP client or other voice connection technology has been started at the user information handling system. If not, the recording agent feeds back to continue to monitor for initiation of the voice connection capabilities of the user information handling system. The system recording agent monitors and listens to the beginning of each call to determine a recordable sequence of events. In an embodiment, the first input of the sequence of events is the input of a phone number.

If a VOIP client or other connection technology has been started, then the flow proceeds to block 215 where the dial in, passcode, and voice responses, among other sequence-accessible call connection access data are recorded or gathered. The recording may not be strictly a digital audio recording of the connection data such as touch tones for keystrokes. Gathering data values of keystrokes dialed into a keypad, including pause times between keystrokes, may be stored instead. Voice responses may be recorded as digital audio recordings or may be converted to a digital text for a voice response. Temporal data pertaining to the sequences of connection access data entered is also gathered by the recording agent. This includes pause times between sequences of dialed numbers, pauses between any voice responses recorded, or pauses between any combinations of dialed numbers and voice responses. The flow proceeds to decision diamond 220 where the recording agent monitors whether the teleconference connection information is completed. There are several possible ways the recording agent determines if the dial in, passcode, voice responses and other connection data has been completed. First, the recording agent may wait for a specified period of time, i.e. a long pause, and determine no more data or voice connection information will be input after a set amount of time has expired since the last entry.

Alternatively, the recording agent may detect that access to a sequence-accessible call on a telecommunications bridge has been granted, for example via a data signal received from the telecommunications bridge. In yet another embodiment, the recording agent may be set to record a fixed amount of data, for example for a dial in number, passcode, and voice greeting. These may be delimited by pauses of a sufficient length. Once the fixed data types are recorded, the recording agent would determine the gathering of connection data is complete. In yet another embodiment, determining that connection information entry is complete may occur when a last non-voice sound is detected or a threshold level of freeform human conversation is detected. In the latter example, the freeform human conversation will last for a period of time longer than a voice prompt response. Data up to the last non-voice sound or the last voice response to a prompt may be the last of the stored connection access data recorded by the system.

The flow then proceeds to decision tree 225 where the recording agent determines if a proximity link is detected with the near field communication (NFC) antenna of the user information handling system. If no NFC proximity link is requested via the NFC antenna, the recording agent monitors the user information handling system for a request to exchange data via NFC. If an NFC proximity link is requested by detection of another proximate user information handling system while a sequence-accessible call is occurring, the recording agent determines that a transfer of connection data and a transfer of the sequence-accessible call voice link are requested. Verification of an intent to transfer may be requested from the user of the sending information handling system that initiated the sequence-accessible call. Similarly or alternatively, the receiving information handling system may seek verification that a transfer is intended. The verification data may be shared between the sending and receiving devices.

Proceeding to block 230, the recording agent, in connection with the VOIP client application or other telecommunications application operating on the sending device, prepares to transfer the call to the receiving information handling system. The recorded connection data is transferred to the receiving information handling system. This connection data includes a delimited token/header that communicates which application should launch in the receiving user information handling system. Any telecommunication service application may be initiated such as Sync, Skype, or other VOIP application as well as regular macrocellular phone applications depending on the type of receiving user information handling system. A default phone application may be pre-chosen in the receiving information handling system for launch. The recorded connection data also includes a data payload containing keystrokes representing dial in numbers, passcodes, host codes, and necessary pauses that are part of the connection access process for a sequence accessible call such as a conference call. An audio payload is also possibly transferred containing voice responses to prompts by the telecommunications bridge system. As before, temporal information such as pauses between voice responses is also maintained in the connection data payload. Such temporal information may be needed to successfully complete accessing the sequence-accessible call. Alternatively, text data of the name or initial greeting may be recorded in the connection data in addition to or instead of audio payload data. This text data may be played back later in a conversion from text to speech upon reconnecting to the sequence-accessible call.

At block 235, the sending information handling system may receive data from the proximate receiving information handling system. Data received may include, for example, a telephone number for the receiving information handling system and availability status to receiving a call. Other identifying information from the receiving user information handling system may be received instead to enable a sequence-accessible call transfer to the receiving device. Proceeding to block 240, the telephone number or other identifying information of the receiving proximate information handling system may be used by the recording agent to initiate a call transfer of the sequence-accessible call link to the receiving device. This initiation may occur via the phone application, such as the VOIP client, operating on the sending device. At this point, the flow ends and the sending user information handling system may terminate the voice communication link with the sequence-accessible call upon transferring the call to the receiving device.

Figure 3:
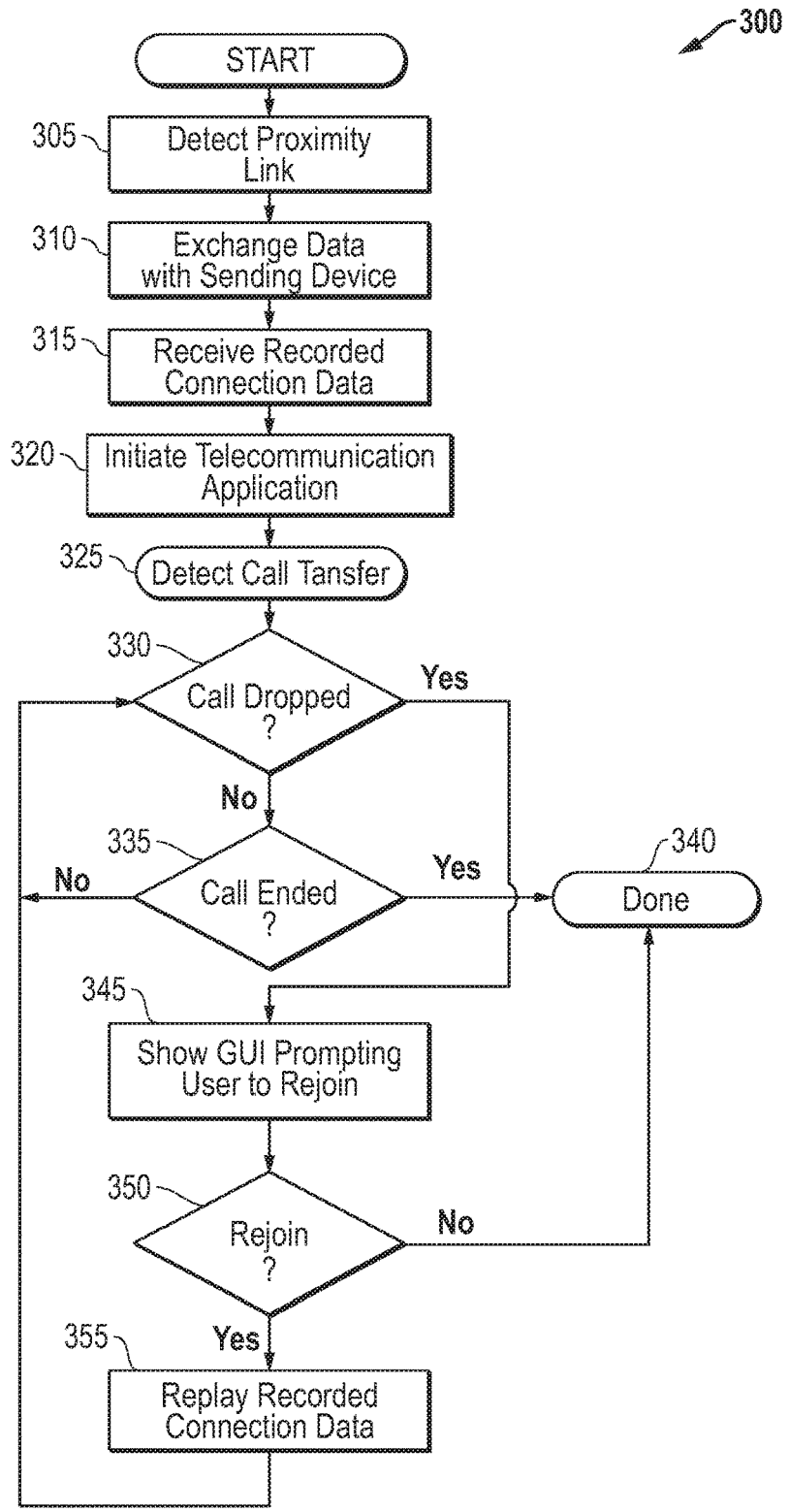
FIG. 3 is a flow diagram illustrating a method of reconnecting to a sequence-accessible call by a user information handling system via gathered connectivity data according, to an embodiment of the present disclosure.

FIG. 3 depicts an embodiment of a reconnection between a user information handling system 130 and a telecommunications sequence-accessible call using gathered connection data received from another user information handling system such as 110 or 120. Some part of this embodiment may be also understood to depict a user information handling system using its own gathered connection data to reconnect to a sequence-accessible call that has been disconnected. However, FIG. 3 shows the transfer of gathered connection data that may occur between or among any of the types of user information handling system 110, 120, and 130 for simplified transfer of a sequence-accessible call between devices. Other user information handling systems other than those depicted may also be relevant in the communications and transfer of a sequence-accessible call. The steps depicted in FIG. 3 relate to the steps for transferring a sequence-accessible call mid-call and connecting a second user information handing system to the call. The second information handling system is the receiving device to which the sequence-accessible call is to be transferred. Should the call drop, for example during transfer, the receiving device receives the connection access data needed to reconnect to the call without redialing and re-recording voice responses.

In this embodiment at 305, the receiving user information handling system detects a proximity link to a sending user information handling system. The proximity link, as described above, may be a near-field communication (NFC) link. Close proximity between NFC antennas of the user information handling systems initiates a wireless data transfer via NFC. Upon detection of the sending device in the near-field link, the receiving user information handling system prepares to exchange data with the sending device at 310. The receiving device may initiate its own recording agent to interpret and utilize the connection data to be transferred to it via NFC. Although described as a recording agent, this software agent may have functionality in addition to or distinct from that described above with respect to FIG. 2. Additional functionality may include managing incoming connection data transfers, determining chosen or default phone applications on the user information handling system, and conducting reconnection procedures such as dialing or playing back voice responses. The recording agent may also monitor connectivity status to a sequence-accessible call among other things. Proceeding to 315, the receiving system receives connection data (e.g., dial-in, passcode, voice responses, etc.). The connection data may be transferred as a packet transfer including keystrokes and recorded voice data. The connection data, as described above, maintains temporal information in that pauses between keystrokes and between keystrokes and voice responses are preserved in the recorded connection data. The packet transfer also includes a delimited token/header containing command and identifying data. The command data may determine which application in the receiving user information handling system should launch and use the connection data that follows.

At 320, the user information handling system initiates a telecommunications application pursuant to the header data received with the connection data in preparation for connection to a sequence-accessible call. Alternatively, the receiving user information handling system my initiate the telecommunications application upon receipt of a registration message received directly from the telecommunication network relating to the transferred sequence-accessible call.

The method proceeds to 325 where the user information handling system detects a transferred call from the telecommunications network. At decision diamond 330, the method detects if the transferred sequence-accessible call has been dropped. For example, if no transferred call is received or upon receipt of the transferred call then it is determined that the communications link has been dropped. If the sequence-accessible call is not dropped, the method proceeds to decision diamond 335 to determine if the sequence-accessible call has ended. If the sequence-accessible call has ended, then the method ends and the process and the sequence-accessible call connection is terminated at 340. If the sequence-accessible call has not ended, the system and method proceed to monitor whether the call is dropped at any time during the call or monitor to determine if the call has ended.

If the sequence-accessible call is determined to be dropped, the method proceeds to 345. At 345, the system displays a graphical user interface prompting a user to rejoin the dropped sequence-accessible call. The graphical user interface may request a simple touch screen response to reconnect to the sequence-accessible call or decline to do so. Alternatively, other types of responses from input devices on the user information handling system may be available to respond including keystrokes on a keypad or buttons depressed to hang up or end the call. Specific gestures on a touchscreen or touchpad, or a voice command may also be detected to determine the user response to rejoin or not.

At decision diamond 350, the user information handling system determines if the touchscreen or other response indicates a command to rejoin the sequence-accessible call or abandon efforts to rejoin the call. If the command not to rejoin is received, then the method ends and the process and the sequence-accessible call connection is terminated at 340.

If the call management system on the receiving system receives the response to rejoin the sequence-accessible call, the system proceeds to 355. At 355, the recording agent reconstructs a sequence of dialed data inputs and voice responses for establishing the connection to the sequence-accessible call from the connection data received from the sending user information handling system. Using the temporal data, the system can recreate the keystrokes needed to dial into the sequence-accessible call and enter a passcode or any other required data. This also includes the appropriate pauses necessary to interface with the sequence-accessible call bridge system server. The recording agent may also replay any recorded voice response information that may be part of the connection requirements for the telecommunications bridge system. Any initialization requirements or other dialing requirements to connect via a particular phone application, such as VOIP, are handled by the recording agent running on the receiving user information handling system. The user should be able to rejoin the call with minimal action, such as responding to a prompt to rejoin the sequence-accessible call. Once the sequence-accessible call ends, the user information handling system terminates the monitoring process of the recording agent and the connection to the sequence-accessible call.

Figure 4:
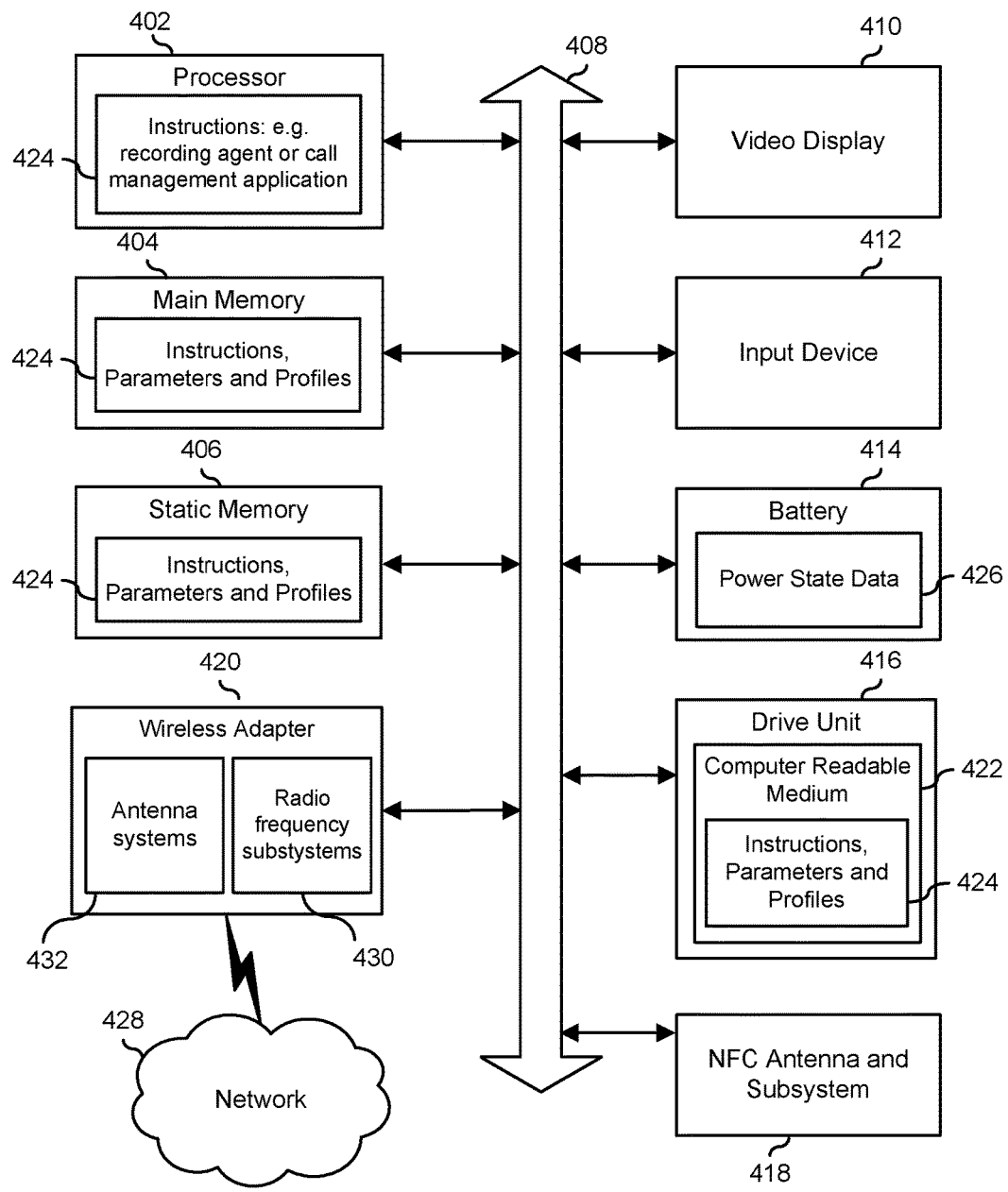
FIG. 4 is a block diagram illustrating an information handling system according, to an embodiment of the present disclosure.

FIG. 4 shows an information handling system 400 capable of administering each of the specific embodiments of the present disclosure. The information handling system 400 can represent the user information handling systems 110, 120 and 130 or servers or systems located anywhere within network 100 of FIG. 1, including the remote data center or cloud 180 operating the virtual machine applications described herein. The information handling system 400 may include a processor 402 such as a central processing unit (CPU), a graphics processing unit (GPU), or both. Moreover, the information handling system 400 can include a main memory 404 and a static memory 407 that can communicate with each other via a bus 408. The information handling system 400 includes near-field communications (NFC) device and interface 418, such as an antenna and NFC subsystem. The information handling system 400 can also include a disk drive unit 416, and a network interface device 420. As shown, the information handling system 400 may further include a video display unit 410, such as a liquid crystal display (LCD), an organic light emitting diode (OLED), a flat panel display, a solid state display, or a cathode ray tube (CRT). The video display unit 410 may also act as an input accepting touchscreen inputs. Additionally, the information handling system 400 may include an input device 412, such as a keyboard, or a cursor control device, such as a mouse or touch pad. Information handling system may include a battery system 414. The information handling system 400 can represent a device capable of telecommunications and whose can be share resources, voice communications, and data communications among multiple devices. The information handling system 400 can also represent a server device whose resources can be shared by multiple client devices, or it can represent an individual client device, such as a laptop or tablet personal computer.

The information handling system 400 can include a set of instructions that can be executed to cause the computer system to perform any one or more of the methods or computer based functions disclosed herein. The computer system 400 may operate as a standalone device or may be connected such as using a network, to other computer systems or peripheral devices.

In a networked deployment, the information handling system 400 may operate in the capacity of a server or as a client user computer in a server-client user network environment, or as a peer computer system in a peer-to-peer (or distributed) network environment. The information handling system 400 can also be implemented as or incorporated into various devices, such as a personal computer (PC), a tablet PC, a set-top box (STB), a smartphone, a PDA, a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 400 can be implemented using electronic devices that provide voice, video or data communication. Further, while a single information handling system 400 is illustrated, the term "system" shall also be taken to include any collection of systems or subsystems that individually or jointly execute a set, or multiple sets, of instructions to perform one or more computer functions.

The disk drive unit 416 or static memory 414 may include a computer-readable medium 422 in which one or more sets of instructions 424 such as software can be embedded. The disk drive unit 416 or static memory 414 also contains space for data storage. Further, the instructions 424 may embody one or more of the methods or logic as described herein. In a particular embodiment, the instructions 424 may reside completely, or at least partially, within the main memory 404, the static memory 406, and/or within the processor 402 during execution by the information handling system 400. The main memory 404 and the processor 402 also may include computer-readable media. The network interface device 420 can provide connectivity to a network 426, e.g., a wide area network (WAN), a local area network (LAN), wireless network (IEEE 802), or other network. The network interface 420 may also interface with macrocellular networks including wireless telecommunications networks such as those characterized as 2G, 3G, or 4G or similar wireless telecommunications networks similar to those described above. The network interface 420 may be a wireless adapter having antenna systems 432 for various wireless connectivity and radio frequency subsystems 430 for signal reception, transmission, or related processing.

In an alternative embodiment, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations. In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 424 or receives and executes instructions 424 responsive to a propagated signal; so that a device connected to a network 428 can communicate voice, video or data over the network 428. Further, the instructions 424 may be transmitted or received over the network 428 via the network interface device 420. In a particular embodiment, BIOS/FW code 424 reside in memory 404, and include machine-executable code that is executed by processor 402 to perform various functions of information handling system 400.

Information handling system 400 includes one or more application programs 424, and Basic Input/Output System and Firmware (BIOS/FW) code 424. BIOS/FW code 424 functions to initialize information handling system 400 on power up, to launch an operating system, and to manage input and output interactions between the operating system and the other elements of information handling system 400.

In another embodiment (not illustrated), application programs and BIOS/FW code reside in another storage medium of information handling system 400. For example, application programs and BIOS/FW code can reside in drive 416, in a ROM (not illustrated) associated with information handling system 400, in an option-ROM (not illustrated) associated with various devices of information handling system 400, in storage system 407, in a storage system (not illustrated) associated with network channel 420, in another storage medium of information handling system 400, or a combination thereof. Application programs 424 and BIOS/FW code 424 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   establishing a connection to a sequence-accessible call via a communication network adapter of a first information handling system;
   gathering connection data including a sequence via a processor of the first information handling system executing code instructions for establishing the connection to the sequence-accessible call, including a phone number dialed to access the sequence-accessible call;
   storing the connection data for the sequence-accessible call in a database memory of the first information handling system;
   determining, via the processor, a presence of a proximity link to a second information handling system; and
   transmitting the connection data for the sequence-accessible call to the second information handling system;
   wherein the proximity link is a near-field communication link via a near-field communication antenna.

2. The method of claim 1, wherein gathering the connection data further comprises gathering passcode data.

3. The method of claim 1, wherein gathering the connection data further comprises gathering voice responses.

4. The method of claim 1, wherein gathering the connection data further comprises temporal gathering of the sequence of dialed numbers and pauses between dialed numbers.

5. The method of claim 1, further comprising:
   initiating a call transfer of the sequence-accessible call via a communication network in response to determining the presence of the proximity link to the second information handling system.

6. The method of claim 1, wherein transmitting the connection data from the database to the second information handling system further comprises a packet transfer including a header that indicates which telecommunications application should launch in the second information handling system.

7. The method of claim 6, further comprising:
   terminating the connection with the sequence-accessible call upon transferring the sequence-accessible call via the communication network to the second information handling system.

8. An information handling system comprising:

a communication network adapter establishing a connection to a sequence-accessible call;

a processor executing code of a connection data gathering system to gather connection data and sequence for establishing the connection to the sequence-accessible call, including a phone number dialed to access the sequence-accessible call;

a storage device for storing the connection data for establishing the connection to the sequence-accessible call;

a proximity link network adapter determining a presence of a proximity link to a second information handling system; and the proximity link network adapter transmitting the connection data for the sequence-accessible call to the second information handling system, wherein the proximity link is a near-field communication link via a near-field communication antenna.

9. The information handling system of claim 8, wherein the connection data further comprises gathered passcode data and voice responses.

10. The information handling system of claim 8, wherein the connection data further comprises a temporal gathering of a sequence of dialed numbers, a voice response, and pauses between the sequence of dialed numbers and the voice response.

11. The information handling system of claim 8, further comprising:

the processor generating an request for verification of transfer to a user.

12. The information handling system of claim 8, wherein gathering the connection data further comprises gathering voice responses.

13. The information handling system of claim 8, further comprising:

the processor receiving an indication of availability of a second information handling system to receive a transferred call via the proximity link network adapter.

14. The information handling system of claim 8, further comprising:

the processor initiating call forwarding of the sequence accessible call to the second information handling system.

15. The information handling system of claim 8, wherein the connection data further comprises a token that indicates which telecommunications application is to be launched.

16. A method comprising:

establishing a connection to a sequence-accessible call via a communication network adapter of a first information handling system;

gathering connection data via a processor of the first information handling system executing code instructions for establishing the connection to the sequence-accessible call, the connection data for the sequence-accessible call comprising temporal dialed data including a phone number and a passcode dialed to access the sequence-accessible call, including pauses between dialed data to access the sequence-accessible call;

storing the connection data for the sequence-accessible call in a database memory of the first information handling system;

determining, via the processor, a presence of a proximity link to a second information handling system; and transmitting the connection data for the sequence-accessible call to the second information handling system;

wherein the proximity link is a near-field communication link via a near-field communication antenna.

17. The method of claim 16, further comprising:

displaying a graphical user interface prompting a user to verify transfer of the sequence-accessible call.

18. The method of claim 16, wherein gathering the connection data further comprises temporal voice data including voice responses and pauses between voice data.

19. The method of claim 16, further comprising:

receiving an indication of availability of a second information handling system to receive a transferred call via the proximity link network adapter.

20. The method of claim 16, further comprising:

receiving a phone number of a second information handling system to which to transfer a sequence accessible call via the proximity link network adapter.

* * * * *